Aug. 10, 1954 — J. M. HALL ET AL — 2,685,794
LOAD MAINTAINER
Filed Jan. 8, 1951

INVENTORS:
JOHN M. HALL
ROBERT L. ANDREWS
DEAN J. MADSEN
MALCOLM F. McCONNELL, JR.
By Herbert E. Metcalf
THEIR PATENT ATTORNEY

Patented Aug. 10, 1954

2,685,794

UNITED STATES PATENT OFFICE 2,685,794

LOAD MAINTAINER

John M. Hall, Hermosa Beach, Robert L. Andrews, Fullerton, Dean J. Madsen, Rolling Hills, and Malcolm F. McConnell, Jr., Manhattan Beach, Calif., assignors to Northrop Aircraft, Inc., Hawthorne, Calif., a corporation of California Application January 8, 1951, Serial No. 205,022

1 Claim. (Cl. 73—88)

This invention relates to methods of conducting structural tests on large test specimens, such as portions of an aircraft or the like, and more specifically to an improved loading system which automatically maintains a constant test load regardless of deflections in the test specimen.

In structural test operations where large test assemblies are under observation, the coordination and correct interpretation of a plurality of test data is often rendered difficult due to deflections in the structure of the test assembly which result from the applied stresses. These bending effects lead to interactions between the multiplicity of applied loads and to other uncontrollable factors whose magnitude cannot be determined very accurately. In structural tests on aircraft, for example, it is customary to mount entire tail assemblies, wing panels or the like, in one single test unit and to subject the entire unit as well as individual components thereof simultaneously to a plurality of loads in order to simulate every conceivable stress-condition to which these portions are likely to be exposed in actual flight. Results of these tests, under limit loads, determine the structural integrity of the test subject and furnish proof for the correctness of basic assumptions which were formulated in the design of each individual component and in the method of their mechanical assembly into a structural unit. Due to the number of loading channels involved, these structural tests often become cumbersome and expensive as each channel requires constant re-adjustment of loads and proper analysis of test data. Test results, under these conditions, may be of questionable accuracy if errors introduced by a combination of deflections in the test specimen or by certain pitfalls in the adopted test procedure are not duly accounted for.

For a proper evaluation of the problems encountered in structural tests of this nature, it is appropriate first to discuss one widely accepted method of test procedure in which the individual loads on a given specimen are applied in the form of a pulling force generated by hydraulic means. The piston of a hydraulic cylinder conveys the amount of stress onto the test specimen. The pressure or, more exactly, the pulling force in each load cylinder is adjusted to place a given load in terms of pounds per square inch onto the test unit. An applied load may constitute the resultant of a plurality of individual stresses, or a combination of loads applied in different directions or around a given axis may simulate shearing or torsional moments, etc. Suitably located strain gauges permit measurement of stresses at regular intervals, and deflections in the test specimen can be read with a transit on scales attached to the specimen.

A given amount of deflection occurring at one location on the specimen may result in a reduction or increase of the load or loads which have been applied at another location on the same specimen. Each applied load, therefore, must remain under close observation, and whenever an unscheduled change registers in the indicated load, the pressure in the respective related hydraulic cylinder must be re-adjusted in order to return the load to its intended magnitude. If incremental loads are under observation, the pressure in each channel must be retained at the same proportion of the ultimate load.

It is an object of the present invention to establish a simple and reliable system of automatic load control for structural tests on large test specimens which is free from hunting effects, time lags and load errors inherent in presently used automatic load control systems.

A further object of the present invention is to make available a load maintaining device which can be set to a given load value by remote control and which, by its own deflections under stress, adjusts the applied load by direct mechanical action.

An additional object of the present invention consists in that it provides a control link for automatic load maintenance which is easy to manufacture for a wide range of loads and which, when once calibrated, retains its high degree of accuracy throughout its entire life.

In brief, the above enumerated objectives of this invention are attained by a dynamometer device whose deflections under load offer a permanently accurate measure for the magnitude of applied loads. In a preferred form, the dynamometer can be a resilient, U-shaped steel link between the source of a pulling force and the point at which this force is to be applied. A valve is located between the legs of the dynamometer which controls the flow of hydraulic pressure to and from a firmly anchored load cylinder whose piston connects to one leg of the dynamometer link. Upon actuation of the valve, a load is thereby applied onto this link in the form of a pulling force which is conveyed to an appropriately restrained test specimen via the other leg of the dynamometer. A plunger protrudes from the valve whose displacement from a neutral position serves to actuate the valve. Deflections in the dynamometer directly result in proportionate displacements of this plunger. The magnitude or duration of ensuing valve actions is intimately correlated with the magnitude of dynamometer deflections. In the present invention, means are provided for artificial displacement of the plunger by remote control and for determining the exact amount of displacement by coordinated timing of the remote control action. Ensuing valve and loading cylinder action applies load onto the dynamometer link which acts to displace the plunger in a sense opposite to the remotely inserted displacement. When the reverse displacement equals that effected by remote control, valve action stops because the plunger has returned to its neutral position. A pre-determined amount of load is now held by this device as long as the neutral plunger position remains undisturbed. If deflections occur in the test specimen, the amount of load on the dynamometer changes whereby a new plunger displacement is enacted which causes the valve to operate until the displacement is reduced to zero by a reversed plunger displacement resulting from the corrective action from the pressure source. In other words, the load is automatically restored to its predetermined value because the valve plunger stays in neutral position only as long as the predetermined amount of load remains on the dynamometer link and on the test specimen. This system of automatic load maintenance is inherently free from hunting effects because the magnitude of corrective action on the plunger position decreases and approaches zero as the amount of load deviation decreases and approaches zero with practically no time delay involved in the sequence of control actions.

A more comprehensive description of the present invention and of its adaptation to a multiple-channel structural test system will be given with reference to the appended drawings in which.

Figure 1:
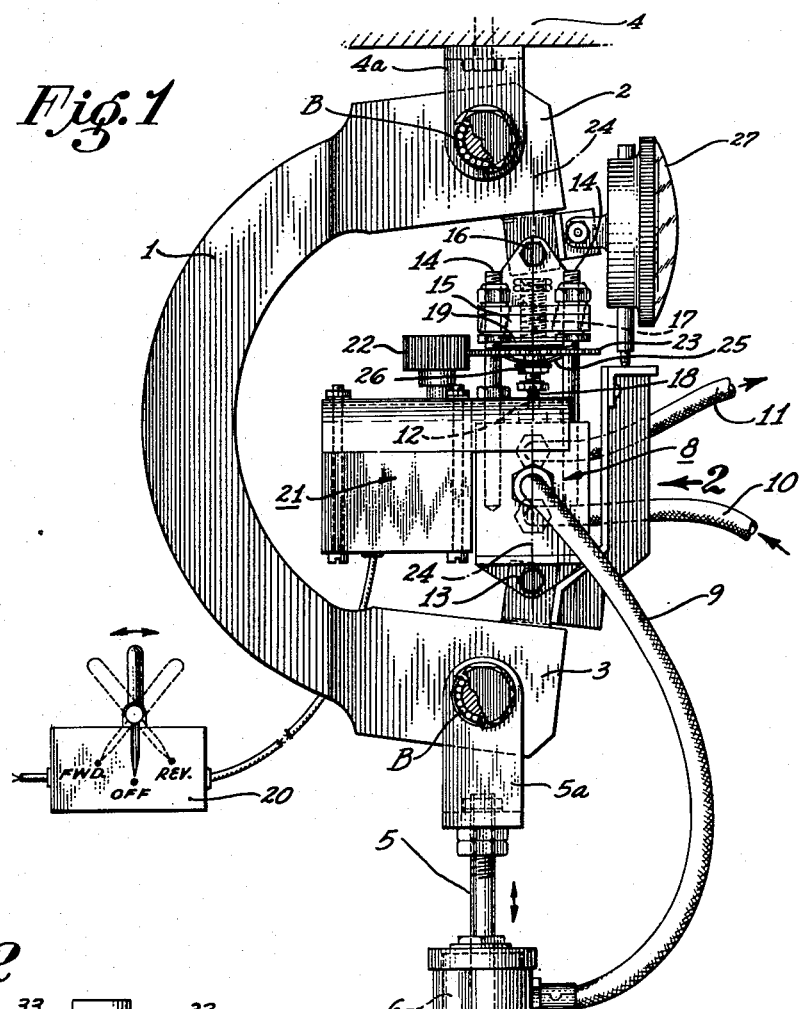
Figure 1 shows a detailed diagrammatic side view of a load maintainer assembly of the present invention in a preferred execution of its components.

In the drawing of Figure 1, the legs 2 and 3 of a U-shaped steel dynamometer 1 can be seen firmly attached to a test specimen 4 by bracket 4a and to the piston rod 5 of a hydraulic cylinder 6 by bracket 5a. Cylinder 6, in turn, is held firmly by a restraining fixture 7. Brackets 4a and 5a are provided with anti-friction bearings, such as roller bearings B. Specimen 4 is also securely held by restraining means not shown. Fluid pressure in cylinder 6 is controlled by valve 8 via line 9 and is supplied to valve 8 by hydraulic pressure line 10, numeral 11 designating the hydraulic return or drain line.

The body of valve 8 is supported on hinge 13 and by two guide rods 14 which slide into apertures in part 8 and are retained in plate guide 15 which, in turn, is firmly attached to leg 2 of the dynamometer by hinge 16. A threaded lead-screw 17 whose ball-shaped tip 18 rests against a pressure-loaded valve plunger 12 is rotatably mounted in plate guide 15. Stops not shown in the diagram are provided which limit the extent of rotation of screw 17. A synchronous motor 21, remotely controlled by switch 20, drives gear 23 through pinion 22. Gear 23 is rotatably mounted upon the body of screw 17, its axis of rotation being the same as that of screw 17. Normally, rotation of gear 23 upon screw 17 is prevented by clutch 19 and spring 25, the clutch being solidly anchored on the leadscrew 17, and pressure of spring 25, supported by locknut 26, determining the amount of torque-restraining force on the lead-screw 17 which will result in slippage of the clutch. Forces produced by the previously mentioned limit stops of leadscrew 17 result in clutch slippage when screw 17 is rotated beyond safety limits. Numeral 27 designates one form of dial indicator, not essential to the operation of the illustrated device, which can be conveniently attached to the dynamometer across legs 2 and 3 in the manner suggested in the diagram.

Figure 2:
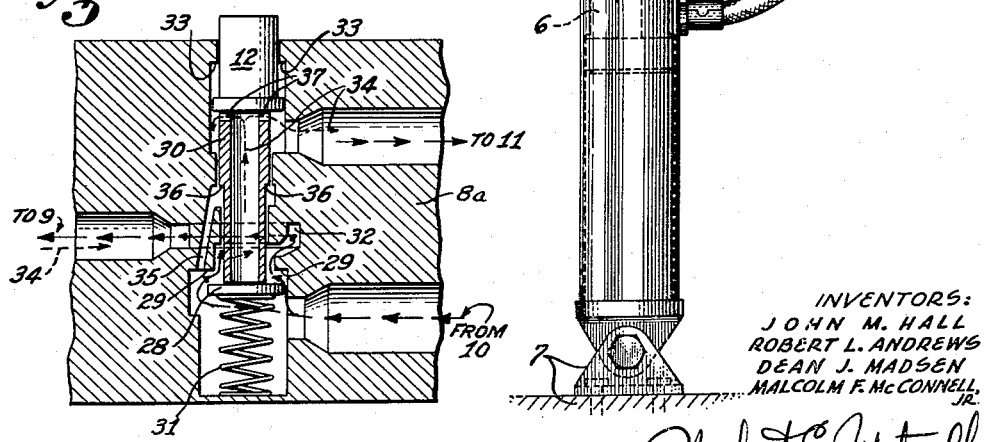
Figure 2 illustrates essential operational details of the preferred type of valve used in Figure 1 as viewed in diagrammatic cross-section in the direction of arrow 2 of Figure 1.

Valve 8 is preferably a poppet valve of the type illustrated in Figure 2 wherein the partly broken-away valve body 8a of valve 8 is shown in an enlarged quasi-sectional view taken in the direction of arrow 2 of Figure 1 at right angles to the plane of that figure and revealing details of the essential components of this type of valve in somewhat exaggerated dimensions. Flow of hydraulic fluid from pressure line 10 to line 9 and cylinder 6 is checked by a slug 28 normally held against seat 29 by spring 31. A hollow floating piston 30 which fits slidably into a bore through the center portion of valve body 8a, forms a rigid connecting link between slug 28 and plunger 12. As long as slug 28 rests against its seat 29, no fluid flows from line 10 to line 9, slug 28 sealing the passage of fluid (through the widened bottom section of the above mentioned bore immediately adjacent to and above slug 28) into port 32 which leads around said bore into line 9. (See flow of arrows from 10 to 9.) With no restraining force acting against plunger 12 from the outside of the valve, slug 28 firmly rests against its seat 29, but plunger 12 has additional play to move outward until stopped against shoulder 33. A bleed line 35 from pressure line 10 constantly exerts sufficient pressure against shoulder 36 of piston 30 so as to hold the latter in contact with plunger 12 at all times. This arrangement acts to lift piston 30 from slug 28 whenever the distance between slug 28 and plunger 12 is allowed to exceed the length of piston 30, which can only occur after the passage of fluid from line 10 to line 9 has been sealed off by slug 28. Separation of piston 30 from slug 28 opens a passage for fluid under back pressure from cylinder 6 (Figure 1) and line 9 through port 32, through the hollow interior of piston 30 and through ports 37 into drain line 11. (See dotted arrows 34.) Valve 8 rests in its neutral or zero position when leadscrew 17 of Figure 1 which governs the displacements of plunger 12, is adjusted in a position to allow slug 28 to rest against seat 29 but, at the same time, to restrain further outward motion of the plunger in order to maintain contact between piston 30 and slug 28.

In order to explain more fully the operation of the device represented in Figure 1, it is best to assume that the assembly has been properly mounted in accordance with the basic data previously given and that it is intended to apply and maintain an initial load of, say, 15,000 pounds onto a given test specimen. To this end, remote control switch 20 is turned into forward position and held there for a span of time which, according to a pre-calculated table, corresponds to the desired magnitude of load. Appropriate reduction gears in the housing of synchronous motor 21, not shown in the diagram, in conjunction with pinion 22 and gear 23, rotate lead-screw 17 through an angle sufficient to displace screw tip 18 along line 24 in a direction towards valve 8 by exactly the amount by which the valve body and plunger 12 would be displaced in the same direction if a 15,000 pound pulling load were directly applied onto leg 3 of dynamometer 1, and if plunger 12 were restrained in a fixed position relative to the valve body. When the dynamometer carries no load and leadscrew 17 is turned into zero position, ball tip 18 holds plunger 12 at the exact null or balance point at which the passage from pressure line 10 to cylinder line 9, as well as that from cylinder line 9 to drain line 11, are closed. Evidently, if the leadscrew 17 upon actuation of switch 20 pushes plunger 12 from its neutral position further into the valve body, the above mentioned slug in valve 8 is lifted from its seat and pressure passes from line 10 through line 9 into cylinder 6. As shown in the diagram, this pressure acts to pull leg 3 of the dynamometer and with it the body of valve 8 away from the leadscrew. The load on the dynamometer thus lifts the leadscrew from plunger 12, and the latter, under pressure from spring 31 of Figure 2 via the floating piston inside the valve, follows the receding leadscrew, thereby allowing the slug gradually to return to its seat. It can be said, therefore, that the lump displacement of plunger 12 through a brief timed actuation of switch 20 immediately is followed by a reverse action which impels the plunger to resume its initial or neutral position. The rate of this reverse displacement is maximum at or near the onset and decreases as the load approaches the desired value of 15,000 pounds. As this point, flow of pressure to cylinder 6 stops completely as the valve slug is again firmly held against its seat.

If we assume now that an unwanted bending effect in the structure of the test specimen has resulted in a sudden increase of the applied load to 18,000 pounds, the additional strain acting on the dynamometer will have pulled ball point 18 further away from the face of plunger 12 allowing the plunger to take up the clearance. As previously explained, back pressure from line 9 is now released into drain line 11, diminishing the cylinder pressure until the decrease in applied load and the ensuing reverse motion of ball point 18 has pushed plunger 12 back far enough against the slug to prevent further seepage of cylinder pressure through the hollow piston. Again, the balance position under the 15,000 pound load setting of leadscrew 17 is restored. Had it been decided to reduce the load from 15,000 pounds to 12,000 pounds by holding switch 20 in reverse position for a proportionate span of time, ball point 18 would have been pulled away from plunger 12 by the same amount as by the unwanted 3,000 pound increase in load caused by the previously assumed deflection in the test specimen. The same sequence of displacements, therefore, would have decreased the load to its new value. Similarly, if a 3,000 pound increase in the load were desired, appropriate actuation of switch 20 in forward position would re-adjust the leadscrew position and thus repeat the first mentioned process of plunger displacement, thereby establishing a new setting of the system for an 18,000 pound load. The distance from the center of hinge 13 to the face of plunger 12 along line 24 is a constant for the neutral or closed position of valve 8. The zero position of leadscrew 17 is adjusted accordingly when the load maintainer unit is first assembled. Whatever load is applied, and whatever changes occur in the load, valve actions initiated by leadscrew displacements will always operate to restore this constant distance. Thus, the overall function of the load maintainer is essentially that of a closed center displacement follow-up device in which the combination of leadscrew 17, plunger 12, floating piston 30 and slug 28 of Figures 1 and 2 simply constitutes the equivalent of a valve spindle composed of an adjustable input shaft (i. e., leadscrew 17) and a valve control portion or assembly (parts 12, 30 and 21), the input shaft being so disposed that it can be set to a given shut-off position in which it will hold the valve control portion in neutral relative to the valve casing portion (= valve body 8a of Figure 2) only as long as a given load condition remains established, any deviation from this load condition resulting in a proportional displacement of the input shaft away from its pre-set position which, in turn, causes the valve control portion to release the necessary hydraulic power for increasing or decreasing the load. This corrective valve action will be stopped when the load has been restored to its original value since the load restoring forces also act to return the input shaft towards its original shut-off position ("follow-up" action of dynamometer under increasing or decreasing strain) so that valve action discontinues as soon as the neutral position of the valve control portion is re-established. It is very important to use antifriction bearings B in order to avoid a hysteresis loop in the valve action.

The load maintainer just described can be constructed in convenient sizes for different overall ranges of loads. Its sensitivity can be increased by increasing the length of the dynamometer legs. A number of load maintainers may be operated simultaneously from a central control point and may be affixed at different locations of one and the same test specimen in order to apply torsional or shearing stresses and the like. The ability of the load maintainer to sustain accurate load values becomes particularly important for this type of loads since relatively insignificant load variations in each single instrument may combine to develop into a significant variation in the resulting shearing force or torsional strain. Further additions and modifications may be provided to suit specific needs.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claim.

What is claimed is:

Means for maintaining a constant load between a fixed element and a duly anchored element to be load tested, comprising a link connecting said elements, said link including a U-shaped dynamometer, means including an antifriction bearing for attaching one leg of said dynamometer to one of said elements, a hydraulic motor having a cylinder member and a piston member, means including a second antifriction bearing for attaching one of said members to the other leg of said dynamometer, the other member of said motor being connected to the other of said elements, a source of hydraulic fluid power communicating with said cylinder, valve means for controlling fluid flow from and to said cylinder positioned between the legs of said dynamometer and including a valve casing portion and a valve control portion, an input shaft for governing the position of said valve control portion relative to said valve casing portion, an attachment from said valve casing portion to one leg of said dynamometer, an attachment from said input shaft to the other leg of said dynamometer, means for holding said input shaft and said valve control portion in series alignment along a straight line which joins said two attachments, and adjustment means for establishing a zero position for said input shaft along said straight line in which said input shaft effectively holds said valve control portion in a neutral position relative to said valve casing so that said valve remains inoperative when no load is applied between said elements, said same adjustment means also permitting displacement of said input shaft along said straight line away from said zero position and away from the point of attachment of said input shaft, said displacement being operative in actuating said valve in a sense so as to apply a given load between said elements, and the amount of said displacement being equal to the amount of reverse displacement of said input shaft and its point of attachment resulting from the dilative strain which said given load creates in said dynamometer.

References Cited in the file of this patent

UNITED STATES PATENTS

| Number | Name | Date |
|---|---|---|
| 1,557,341 | Scalbom | Oct. 13, 1925 |
| 1,650,736 | Zelov | Nov. 29, 1927 |
| 1,742,892 | Belcher | Jan. 7, 1930 |
| 1,888,755 | Barr et al. | Nov. 22, 1932 |
| 2,112,252 | Sang | Mar. 29, 1938 |
| 2,220,180 | Spitzglass et al. | Nov. 5, 1940 |
| 2,367,009 | Davis, Jr. | Jan. 9, 1945 |
| 2,436,317 | Manjoine | Feb. 17, 1948 |

FOREIGN PATENTS

| Number | Country | Date |
|---|---|---|
| 587,667 | Great Britain | May 2, 1947 |